May 15, 1956        B. G. ELLIOTT        2,745,237
TRANSFER MECHANISM FOR USE IN HARVESTING MACHINES
Filed Jan. 26, 1953        4 Sheets-Sheet 1
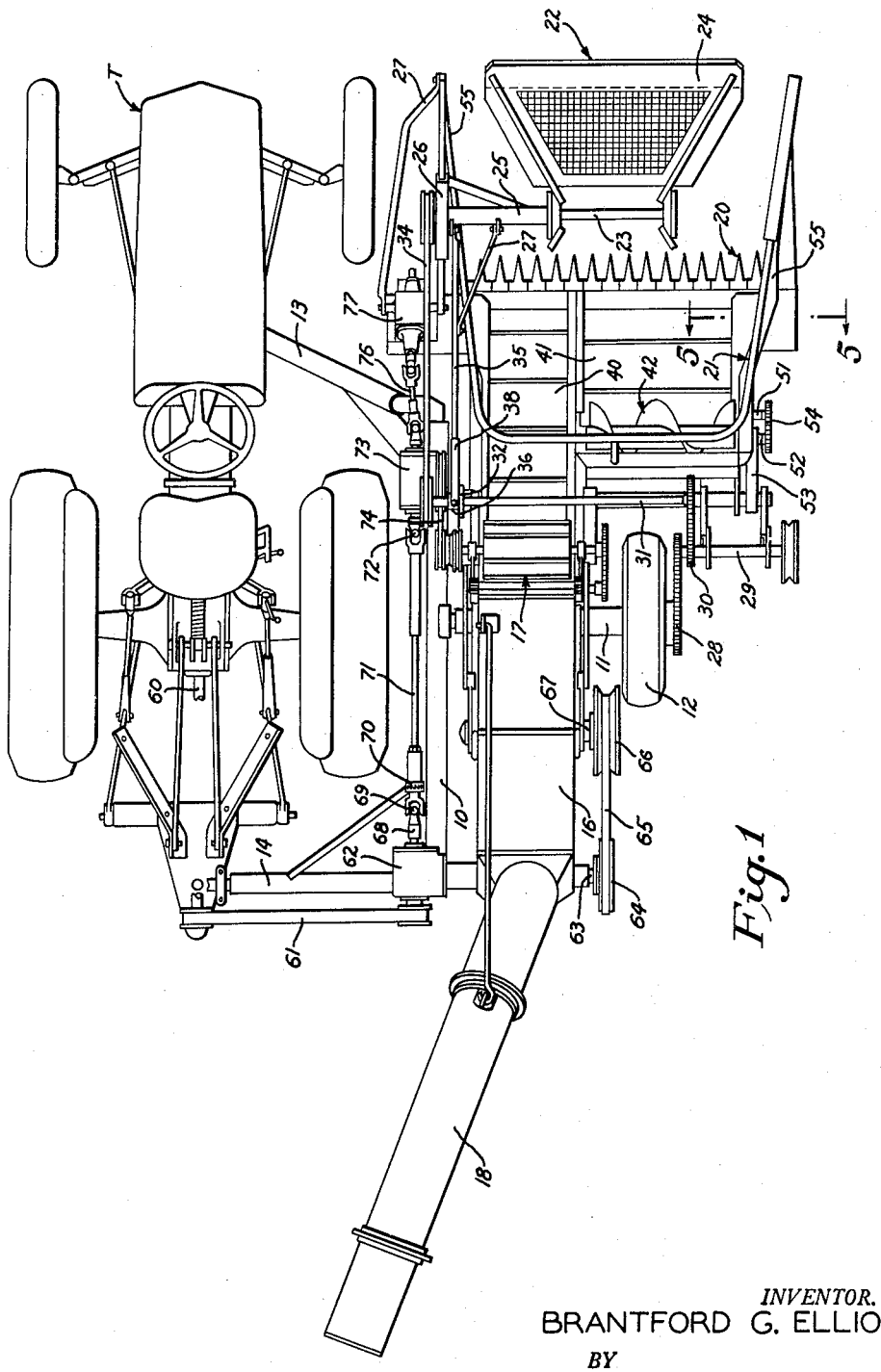
INVENTOR.
BRANTFORD G. ELLIOTT
BY
*Carlson, Pitzner, Hubbard & Wolfe*
ATTORNEYS.

May 15, 1956 B. G. ELLIOTT 2,745,237
TRANSFER MECHANISM FOR USE IN HARVESTING MACHINES
Filed Jan. 26, 1953 4 Sheets-Sheet 2
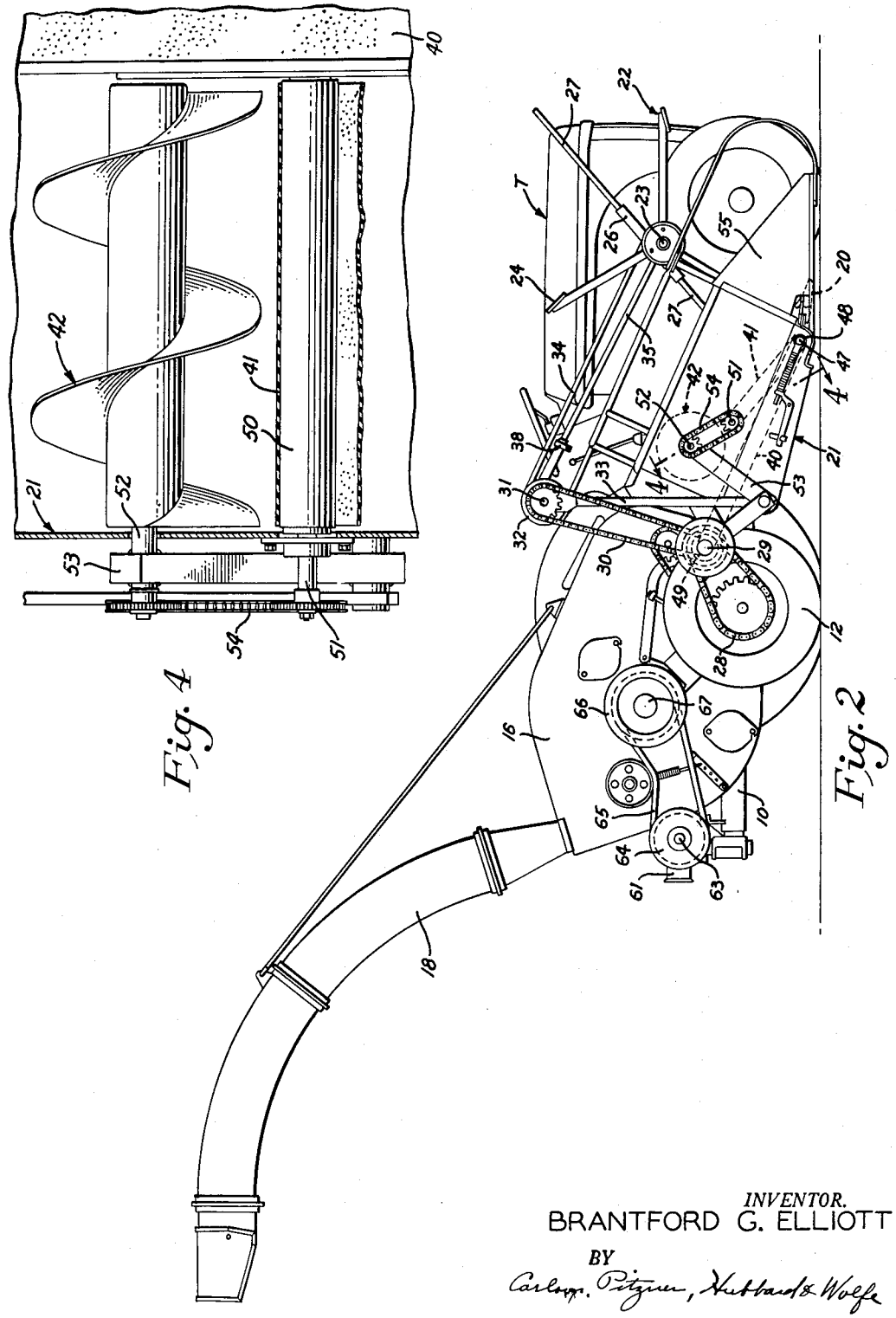
*INVENTOR.*
BRANTFORD G. ELLIOTT
BY
*ATTORNEYS.*

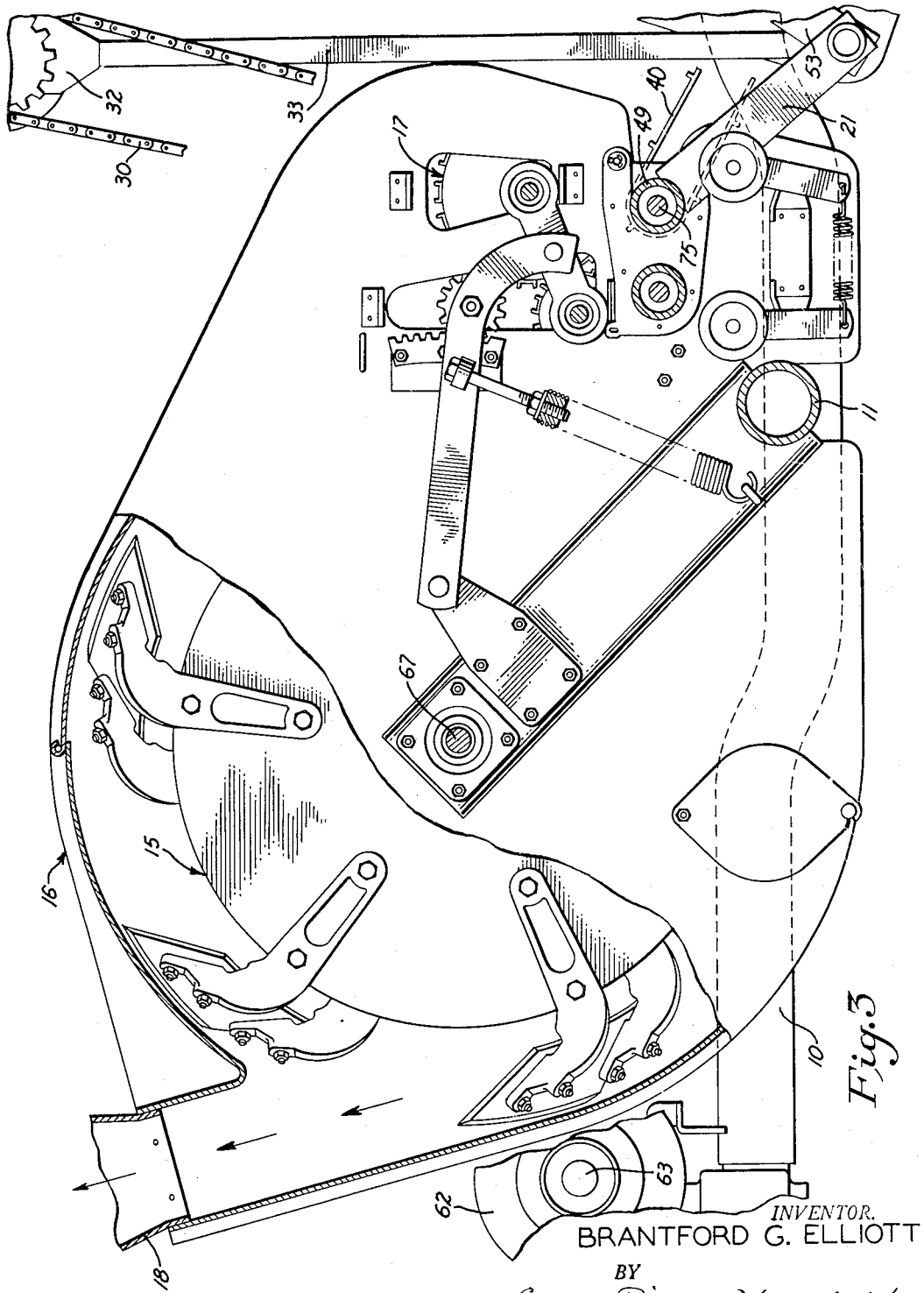

May 15, 1956 B. G. ELLIOTT 2,745,237
TRANSFER MECHANISM FOR USE IN HARVESTING MACHINES
Filed Jan. 26, 1953 4 Sheets-Sheet 4

INVENTOR.
BRANTFORD G. ELLIOTT
BY
ATTORNEYS.

United States Patent Office 2,745,237
Patented May 15, 1956

2,745,237

TRANSFER MECHANISM FOR USE IN HARVESTING MACHINES

Brantford G. Elliott, Royal Oak, Mich., assignor to Harry Ferguson, Inc., Detroit, Mich., a corporation of Delaware Application January 26, 1953, Serial No. 333,191

8 Claims. (Cl. 56—60)

The invention relates to harvesting machines of the type adapted to gather crop material in the field from a relatively wide swath and chop or otherwise treat the material, and it is more particularly concerned with the mechanism for transferring the crop material from the point at which it is gathered from the ground to the treating mechanism provided in the machine.

One object of the invention is to provide improved transfer mechanism for harvesting machines of the above general character and particularly for machines of the type known as forage harvesters, which is adapted to take the material gathered from a relatively wide swath and in the course of its transfer, to compact it into a substantially narrower and thicker stream for delivery through a narrow material receiving opening, wherein the compacting of the material is effected at a point sufficiently remote from the point at which it is gathered from the ground to avoid any interference with the mechanism for performing the latter function.

The improved transfer mechanism, while not limited to such use, is particularly well suited for incorporation in machines of the type adapted to harvest standing crops, that is, to cut and treat the crop material in one operation. Such machines are conventionally provided with a relatively wide cutter bar for severing the crop material and a rotatable reel for sweeping the severed material rearwardly of the cutter bar onto a conveyor for transfer to the treating mechanism. Where the latter mechanism has a narrow intake opening, the wide stream of material received from the cutter bar must be compacted laterally to conform to the width of the opening.

Various arrangements have been proposed for effecting such compacting of crop material moving from a cutter bar or other pickup means to the crop treating mechanism. For example, it has been proposed to provide converging guide walls along the sides of a conveyor for compressing the conveyed material laterally. This arrangement has the disadvantage that the upper strata of the material, that is, the material farthest from the conveyor, tends to lag behind that close to or in direct contact with the conveyor, thereby reducing the carrying capacity of the mechanism and interfering with proper movement of the material through the machine.

It has also been proposed to provide one or more transversely disposed screw or auger conveyors adjacent the cutter bar for moving cut material laterally onto a narrow conveyor belt for transport to the treating mechanism. Such arrangements require a relatively high setting of the reel which sweeps the cut material from the cutter bar onto the conveyor and are practical only when the material to be cut stands in the neighborhood of twenty-four inches high. Accordingly, low growing crops, such as grass, alfalfa, etc., which are often cut when only six or eight inches high, cannot be harvested by such machines, but are first mowed and raked into windrows.

With the above in view, a more specific object of the invention is to provide, for harvesting machines equipped with cutter bars and reels, an improved transfer mechanism which enables the reel to be set as close to the cutter bar as desired, so that even the shortest crops can be harvested while standing, thus eliminating the mowing and raking operations heretofore required.

Another object is to provide a novel crop transfer mechanism in which the lateral compacting of the transferred material is effected at a point sufficiently remote from the point at which the material is gathered from the ground to avoid interference with the gathering of the material.

It is also an object of the invention to simplify and improve the construction of the transfer mechanism and the drive therefor to make it more rugged and capable of operating efficiently and dependably under the rough treatment commonly accorded agricultural implements.

Other objects and advantages of the invention will become apparent from the following detailed description of the preferred embodiment illustrated in the accompanying drawings in which:

Figure 1 is a plan view of a harvesting machine equipped with transfer mechanism embodying the features of the invention, the machine being shown coupled to a conventional lightweight agricultural tractor and with a portion of the reel broken away.

Fig. 2 is a side elevation of the machine shown in Fig. 1.

Fig. 3 is an enlarged, partly sectioned side view of the cutter head constituting the material treating mechanism of the exemplary machine, portions of the housing being broken away to show enclosed elements.

Fig. 4 is an enlarged sectional view taken in a plane substantially on the line 4—4 of Fig. 2 showing details of the transfer mechanism.

Figure 5:
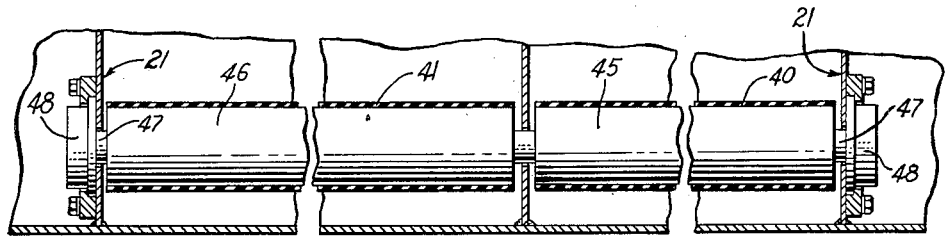
Fig. 5 is an enlarged fragmentary sectional view taken in a plane substantially on the line 5—5 of Fig. 1 showing details of the supports for the lower conveyor guide rolls.

For purposes of illustration, the invention has been shown as incorporated in a tractor-drawn harvesting machine of the type commonly known as a forage harvester adapted to cut hay and comparable forage crops and chop the cut material into relatively short lengths. It is to be understood, however, that this showing is merely exemplary and that the invention may be used to advantage in other types of agricultural implements and machines, including those adapted to gather previously cut crops, as well as those operating on standing crops. It is also to be understood that various changes and modifications may be made in the form, construction and arrangement of the parts constituting the transfer mechanism, without departing from the spirit and scope of the invention as expressed in the appended claims.

Referring to Figs. 1 and 2 of the drawings, the forage harvester in which the improved transfer mechanism has been shown, is adapted to be coupled in side-by-side relation to a tractor T which partially supports the implement and supplies motive and driving power for its operation. The exemplary implement has a rigid frame, including a longitudinally disposed frame bar 10 and a generally centrally located transverse member 11. The transverse member has one end welded or otherwise rigidly attached to the frame bar 10 and at its other end journals a ground wheel 12 which cooperates with the tractor T in supporting the machine. For attachment to the tractor, the longitudinal bar 10 has lateral extensions 13 and 14 adjacent its front and rear ends. Such attachment may be effected by cooperating coupling elements on the extensions and the tractor as disclosed and claimed in the co-pending application of Noral A. Nelson, Serial No. 218,636, filed March 31, 1951, now Patent No. 2,707,643 of May 3, 1955.

As indicated heretofore, the exemplary machine is adapted to cut standing crops and chop the cut material into short lengths. Such chopping is effected by a rotary cutter 15 (Fig. 3) enclosed in a housing 16 supported on the machine frame. The housing 16 has an inlet opening at one side through which the material to be cut is delivered by a feed mechanism 17 comprising a pair of horizontally disposed cooperating feed rolls (Fig. 6) of substantially the same length as the cutter 15. The cutter acts in wellknown manner to chop the material into short lengths and the chopped material is expelled from the housing through an upwardly and rearwardly inclined discharge pipe 18 which deposits it in a wagon or other suitable conveyance.

The cutter and feed mechanisms shown are respectively disclosed and claimed in the related co-pending application of Herman G. Klemm and Brantford G. Elliott, Serial No. 309,108, filed September 11, 1952, and my related co-pending application, Serial No. 333,192, filed January 26, 1953, which said Klemm and Elliott related copending application Serial No. 309,108 is assigned to the same assignee as that to which the present application is assigned. A characteristic of this cutter is its short axial length and consequently the housing 16 and the inlet opening thereto have a correspondingly short transverse dimension or width.

The standing crop material is cut by means of a reciprocatory sickle or cutter bar 20 which may be of conventional construction mounted so as to extend transversely across the front of the machine. The material cut by the sickle is gathered and transported to the feed mechanism, as will appear presently. Preferably the cutter bar 20 is supported on an auxiliary or subframe 21 pivotally mounted on the main machine frame to swing about a horizontally disposed transverse axis as disclosed and claimed in my related co-pending application, Serial No. 248,930, filed September 29, 1951. This is to permit adjustment of the cutting height, that is, the height of the cutter bar above the ground. A rotatable reel 22 provided on the auxiliary frame 21 acts to sweep the cut material back from the cutter bar 20 for transfer to the cutter 15 for treatment. As herein shown, the reel 22 comprises a shaft 23 upon which are mounted a series of radially projecting paddles 24 spaced apart uniformly circumferentially of the reel. The shaft 23 is journaled in suitable bearings 25 (Figs. 1 and 2) carried on an adjustable standard 26 extending generally upwardly and forwardly from one side of the auxiliary frame 21 and rigidly held in place by a brace bar 27. A similar standard and bearing may be provided at the other side of the auxiliary frame if desired.

The reel 22, in this instance, is driven from the ground wheel 12 of the machine through the medium of a chain drive connection 28 to an intermediate shaft 29 journaled on the machine frame. The intermediate shaft is supported with its axis substantially coincident with the pivot of the auxiliary frame 21 and is drivingly connected by a chain 30 with a shaft 31 extending transversely across the machine. Shaft 31, as shown, is journaled in bearings 32 carried at the upper ends of standards 33 extending upwardly from the auxiliary frame 21. A V-belt 34 provides a driving connection between the shaft 31 and the reel shaft 23. The two shafts are held in spaced relation against the pull of the belt by a rigid link 35 extending between a sleeve 36 on the shaft 31 and a bearing sleeve 25 on the reel shaft. Preferably, the link 35 is constructed in two sections joined by a coupling 38 permitting adjustment of the overall effective length of the link for regulating belt tension.

In carrying out the invention, the mechanism for transferring the cut material from the cutter bar 20 to the feed mechanism 17 for delivery to the cutter 15 is constructed and arranged to carry the cut material rearwardly of the cutter bar in a stream of substantially the same witdh as the swath cut by the cutter bar 20. At a point well back of hte bar, the stream of material is compcated laterally, that is, a part of it is moved transversely and combined with the remainder of the material to form a substantially narrower material stream, in this instance, of approximately the same width as the inlet opening to the cutter housing 16. The initial rearward transfer of the cut material without compacting, keeps the cutter bar 20 clear of material at all times and permits the reel 22 to be set as close to the cutter bar as desired so that even the shortest crop material can be cut efficiently.

Figure 6:
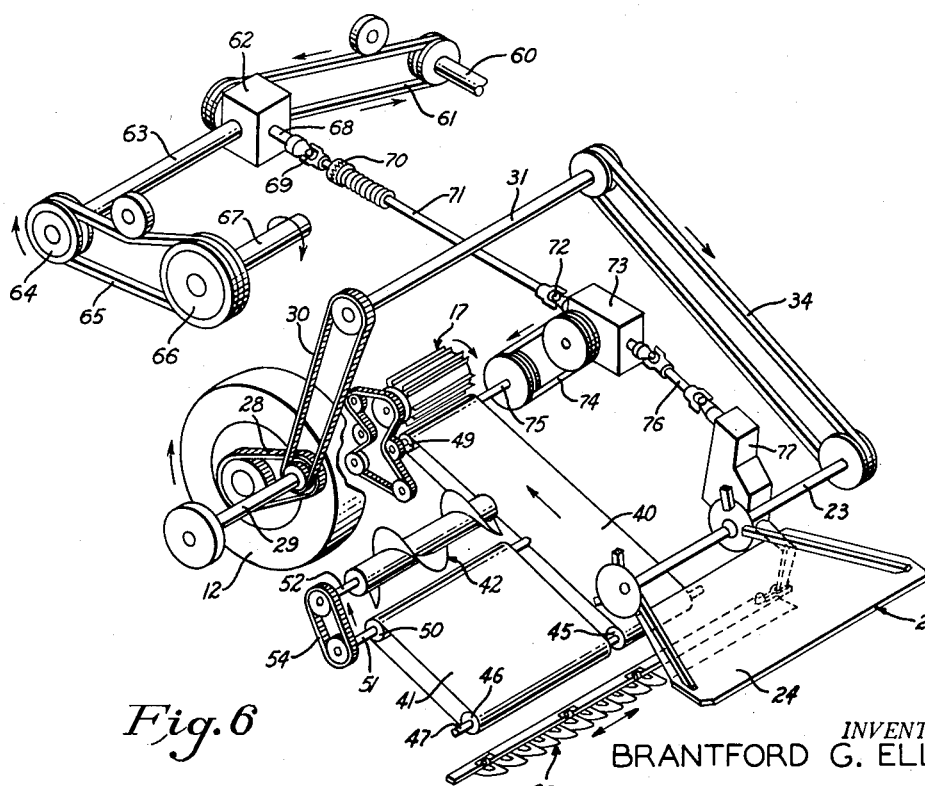
Fig. 6 is a diagrammatic view showing the drive for the various elements of the machine.

Referring more particularly to Figs. 1 and 6 of the drawings, the transfer mechanism in its preferred form includes a pair of apron type or endless belt conveyors 40 and 41 arranged in side-by-side relation and running in a fore and aft direction. The first conveyor belt 40, in this instance, has a width substantially equal to the width of the inlet opening of the cutter housing 16, while the second conveyor belt 41 is dimensioned to extend the remainder of the length of the cutter bar. In other words, the two conveyor belts together have an overall width substantially equal to the width of the swath cut by the cutter bar 20.

The narrow conveyor belt 40 is arranged in line with the feed mechanism 17 and extends from a point adjacent the rear of the cutter bar 20 into operative relation to that feed mechanism. Conveyor belt 41, on the other hand, has its forward end disposed closely adjacent the cutter bar 20 but terminates at a point intermediate the ends of the companion conveyor belt 40. Provision is made at that point for shifting the material carried by the belt 41 laterally onto the conveyor belt 40. Such shifting is effected by a third or cross conveyor 42, preferably of the auger type, as shown in Figs. 1 and 6.

Referring more in detail to Figs. 4, 5 and 6 of the drawings, the conveyor belts 40 and 41 are supported at their forward ends by guide rolls 45 and 46 carried by a cross shaft 47 suitably journaled in bearings 48 carried on the side members of the auxiliary frame 21. At its rear or discharge end, the conveyor belt 40 runs over a guide roll 49 which constitutes one of the rolls of the feed mechanism 17 (see Fig. 3). Conveyor belt 41 at its rear or delivery end passes over a guide roll 50 carried by a shaft 51 journaled on the auxiliary frame 21. A shaft 52 constituting the supporting driving shaft for the auger conveyor 42 is supported parallel to and closely adjacent the shaft 51 by brackets 53 on the auxiliary frame.

While the several conveyors may be driven in any preferred manner, in the instant case, all three conveyors, that is, the belt conveyors 40 and 41 and the auger conveyor 42, are driven from the feed roll 49 which, in turn, is driven from the power takeoff shaft of the tractor. Conveyor belt 40, in this instance, acts as a transmission belt driving the guide roll 45 which is keyed or otherwise non-rotatably fixed to the shaft 47. Guide roll 46 is likewise keyed to the shaft 47 whereby the conveyor belt 41 is driven and acts to transmit driving power to the guide roll 50. This guide roll is fixed to the shaft 51 which has a chain and sprocket drive connection 54 with the auger shaft 52.

In the operation of the machine, as the tractor T is driven forwardly, the cutter bar 20 severs the standing crop material in the usual manner and this cut material is swept back by the paddles 24 of the reel and deposited on the conveyor belts 40 and 41 in a stream of the same width as the swath cut by the bar. Side plates 55 arranged on opposite sides of the conveyor belts confine the cut material thereto as it is carried rearwardly of the machine. The material carried by the conveyor belt 40 moves rearwardly in a straight line to the feed mechanism 17. Material carried by the conveyor belt 41, however, is shifted laterally by the auger conveyor 42 and deposited on the belt 40 along with the material received by that conveyor belt directly from the cutter bar. Thus, all of the cut material is delivered to the feed mechanism by the belt 40 in a stream substantially narrower than the swath cut by the cutter bar 20. As the several conveyors are driven in unison, material flow progresses uniformly and without objectionable bunching.

Location of the laterally moving conveyor or auger 42 a substantial distance to the rear of the cutter bar 20 assures quick and complete clearing of the cut material from the cutter bar. Moreover, it permits the reel 22 to be mounted closely adjacent the cutter bar with the paddles 24 just clearing the bar. It will be understood, of course, that the reel may also be spaced farther from the cutter bar when desired. Accordingly, crops of any height can be harvested effectively while standing. Thus the usual mowing and raking operations heretofore necessary in harvesting short crops are eliminated.

In the particular implement illustrated, power for driving rotary cutter 15, the feed mechanism 17, the cutter bar 20 and the three conveyors 40, 41 and 42 of the transfer mechanism is derived from the power takeoff shaft 60 of the tractor T to which the implement is coupled. As best shown in Figs. 1 and 6 of the drawings, the shaft 60 is connected by a belt and pulley drive 61 with a gear box 62 carried on the frame of the harvesting machine. One shaft 63 extending laterally from the gear box, has a pulley 64 connected by a belt 65 with a pulley 66 keyed to a shaft 67 which constitutes the drive shaft for the rotary cutter 15.

Another shaft 68 extends forwardly from the gear box 62 and is connected through universal joint 69, clutch 70, shaft 71 and universal joint 72 with a second gear box 73. Power is transmitted from the second gear box through a belt and pulley connection 74 to a shaft 75 which carries the feed roll 49 of the feed mechanism 17. A universally jointed shaft 76 connects the gear box 73 with a gear box 77 which drives the reciprocating element of the cutter bar 20 in the conventional manner.

The common drive for the rotary cutter 15, feed mechanism 17 and conveyors 40, 41 and 42 constituting the transfer mechanism insures delivery of cut material to a cutter at a uniform rate and in the proper amount for efficient operation. The transfer mechanism, through its novel lateral compacting action on the cut material, transforms the wide thin stream of cut material received from the cutter bar into a narrow, thicker stream capable of passing through the inlet opening to the rotary cutter. Jamming of the cut material in its rearward movement is avoided and frictional resistance to such movement is reduced to a minimum. The improved transfer mechanism is simple and rugged in construction, efficient in operation, and capable of operating for long periods with a minimum of attention even under the rough usage to which farm implements are commonly subjected.

I claim as my invention:

1. In a forage harvester, in combination, a rotatably driven cutter, a pair of horizontally disposed cooperating feed rolls disposed forwardly of said cutter for feeding material thereto, said feed rolls having a length substantially equal to the width of said cutter, material cutting and gathering means located forwardly of said feed rolls including a cutter bar having a length substantially greater than the length of the feed rolls, a first endless conveyor belt having a width approximately equal to the length of the feed rolls, guide rolls supporting said conveyor belt, one of said guide rolls being located closely adjacent said cutter bar for receiving material cut by the bar and the other closely adjacent said feed rolls for delivering material thereto, a second endless conveyor belt, guide rolls supporting said second conveyor belt at one side of said first belt, one of said rolls being located closely adjacent said cutter bar for receiving material cut by the bar and the other disposed intermediate the rollers supporting said first conveyor belt, and a screw conveyor supported adjacent said other end of the second conveyor belt in a position to receive material therefrom and to move such material laterally of the second conveyor belt and deposit it on said first conveyor belt.

2. The combination with means for gathering material from a swath of predetermined width and a set of feed rolls substantially narrower than the swath, of a pair of endless conveyor belts having a combined width substantially equal to the width of the swath, one of said conveyor belts having a width substantially equal to that of the feed rolls, guide rolls supporting said one conveyor belt with one end adjacent the gathering means to receive material therefrom and the other adjacent the feed rolls to deliver material thereto, other guide rolls supporting the other conveyor belt with one end adjacent the gathering means to receive material therefrom and the other end intermediate the ends of said one conveyor belt, and a screw conveyor supported adjacent the other end of said other conveyor belt in a position to move the material transported by the other conveyor belt transversely of that belt and onto said one conveyor belt.

3. The combination of means for gathering crop material from a swath of predetermined width and a set of feed rolls substantially narrower than the swath supported in rearwardly spaced relation to the gathering means, of a first conveyor of substantially the same width as said feed rolls supported in a position to convey material in a substantially straight line from the gathering means to the feed rolls, a second conveyor supported in a position to carry material from the gathering means in a substantially straight path parallel to and spaced laterally of said first conveyor, and a third conveyor supported adjacent said second conveyor in a position to move the material transported by that conveyor transversely onto said first conveyor.

4. The combination of means for gathering crop material from a swath of predetermined width and a set of feed rolls substantially narrower than the swath supported in rearwardly spaced relation to the gathering means, of a first conveyor of substantially the same width as said feed rolls supported in a position to convey material in a substantially straight line from the gathering means to the feed rolls, a second conveyor supported in a position to carry material from the gathering means in a path displaced laterally from and generally parallel to said first conveyor to a point intermediate the ends of and substantially above the first conveyor, and a third conveyor supported in position to move the material carried by said second conveyor onto said first conveyor.

5. In an agricultural machine having means for gathering crop material from a swath of predetermined width, the combination of a pair of endless belt conveyors supported in side-by-side relation in position to receive and transport the material gathered from said swath, said conveyor belts having a combined width substantially equal to the width of the swath, one of said belts being shorter than the other, and an auxiliary conveyor spaced substantially from the point at which material is received by the shorter belt for transferring the material transported by the shorter belt onto the longer belt.

6. In an agricultural machine having means for gathering crop material from a swath of predetermined width, the combination of a pair of endless belt conveyors supported in side-by-side relation in position to receive and transport the material gathered from the swath by the gathering means, said conveyor belts having a combined width substantially equal to the width of the swath, one of said belts being shorter than the other, and a screw type conveyor supported adjacent said shorter belt for transferring the material transported thereby to the longer belt at a point spaced substantially from that at which the longer belt receives material from the gathering means.

7. In a harvesting machine, in combination, a pair of endless conveyor belts arranged in side-by-side relation and positioned for gathering and transporting material from a swath of a width substantially equal to the combined width of the belts, and a screw conveyor disposed transversely of one of said belts for transferring the material gathered and transported thereby onto the other of the belts at a point intermediate its ends.

8. In a harvesting machine, in combination, an elongated cutter bar, a rotatably driven reel mounted above said cutter bar in position to sweep back the material cut by the bar, a pair of conveyor belts having an overall width substantially equal to the length of said cutter bar and extending rearwardly from the cutter bar, said belts at their forward ends terminating closely adjacent the bar in a position to receive cut material swept back by said reel, and means operative to move the material laterally from one of said conveyor belts to the other, said means being positioned rearwardly of said cutter bar sufficiently to allow said reel to operate in close proximity to the bar.

References Cited in the file of this patent

UNITED STATES PATENTS

| | | |
|---|---|---|
| 1,727,616 | Pro | Sept. 10, 1929 |
| 2,123,547 | Raney | July 12, 1938 |
| 2,332,006 | Oehler | Oct. 19, 1943 |
| 2,554,195 | Jones | May 22, 1951 |